(No Model.)
M. N. ELWELL.
FEEDER FOR GRINDING MILLS.
No. 360,284. Patented Mar. 29, 1887.
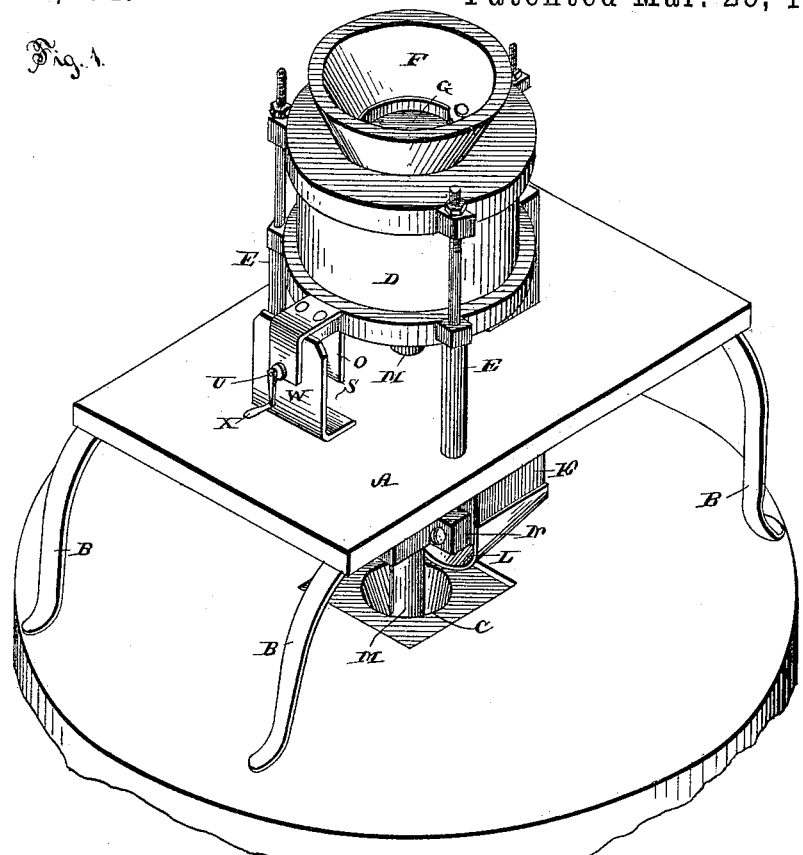
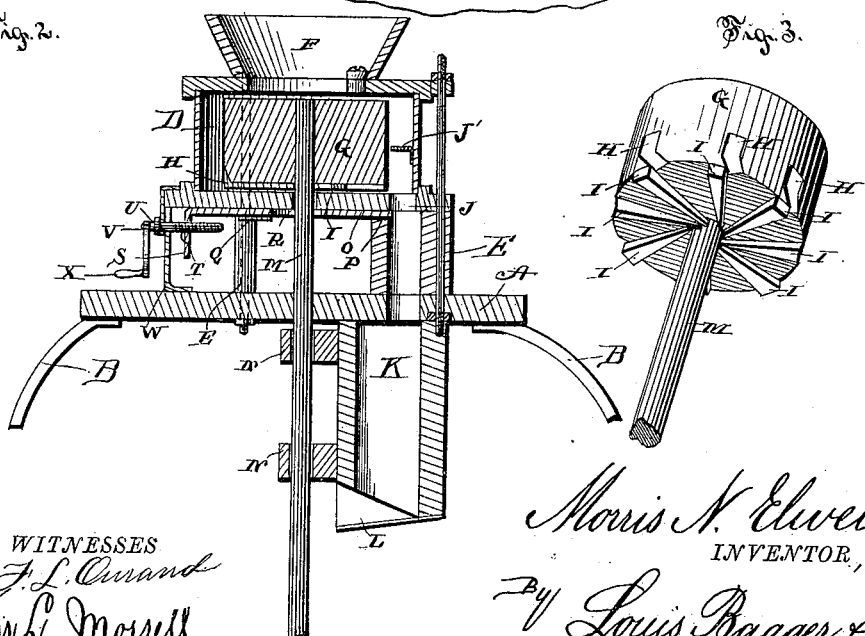
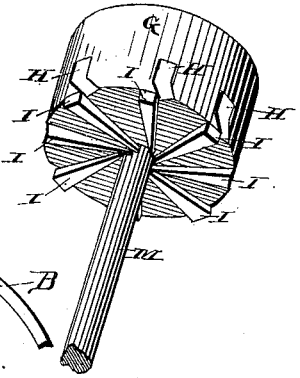
WITNESSES
Morris N. Elwell,
INVENTOR,
By Louis Bagger & Co.
Attorneys.

UNITED STATES PATENT OFFICE.

MORRIS N. ELWELL, OF ONEONTA, NEW YORK.

FEEDER FOR GRINDING-MILLS.

SPECIFICATION forming part of Letters Patent No. 360,284, dated March 29, 1887.

Application filed August 3, 1886. Serial No. 209,874. (No model.)

*To all whom it may concern:*

Be it known that I, MORRIS N. ELWELL, a citizen of the United States, and a resident of Oneonta, in the county of Otsego and State of New York, have invented certain new and useful Improvements in Feeders for Grinding-Mills; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved feeder for grinding-mills, showing it in position. Fig. 2 is a vertical sectional view of the same, and Fig. 3 is a perspective view seen from the under side of the distributing-disk.

Similar letters of reference indicate corresponding parts in all the figures.

My invention has relation to feeders for grinding-mills, in which the grain will be fed in an even stream to the stones, and in which the feed may be regulated; and it consists in the improved construction and combination of parts, as hereinafter more fully described and claimed.

In the accompanying drawings, the letter A indicates a table or platform, supported above the casing of the millstones by legs B, the center of the table being above the center of the casing C of the stones. A cylindrical casing, D, is supported upon suitable legs, E, above the table, and is provided with a funnel-shaped hopper, F, at its upper end, and a disk or flat cylinder, G, revolves within this casing, having slightly-oblique grooves H upon the lower portion of its periphery and obliquely-radiating ribs I upon its lower face.

The bottom of the cylindrical casing is provided with an aperture, J, near the periphery. A chute, K, having a slightly inclined and rounded shield or spout, L, at its lower end, covering the said end and forming the discharge-aperture at the inner side of the chute, extends from the aperture J in the cylindrical casing downward to the central opening of the grinding-casing. A guard, J', secured upon the inner side of the casing D above the aperture J, prevents the grain from falling from the top of the disk G into the chute in irregular quantities, but causes it to fall to one side or the other of the opening of the chute, when it will be carried around by the grooves and ribs of the disk to the said opening and feed in a regular stream.

The disk or runner of the feeder is secured to the upper end of a shaft, M, journaled in bearings N N upon the inner side of the chute, and the lower end of this shaft is connected to the yoke or shaft of the runner and revolved with the same, so that the runner of the feeder may be revolved by the runner of the mill. A slide, O, has its inner end sliding in suitable ways, P, formed in the upper end of the chute below the bottom of the cylindrical casing, and slides in ways Q Q upon the bottom of the casing, and is provided at its central portion with a longitudinal slot, R, through which the vertical shaft passes, and with a downwardly-projecting lip, S, at its outer end, having a screw-threaded perforation, T. The inner end of a screw, U, fits in this screw-threaded perforation, and the outer smooth end is journaled in a suitable bearing, V, in a bracket, W. The outer end of said screw is provided with a suitable handle, X, or similar means for revolving it.

It will now be seen that when grain is fed into the hopper of the feeder and the runner of the feeder is revolved with the runner of the mill the grain will be thrown outward in the cylindrical casing by centrifugal force. The oblique grooves in the lower portion of the periphery of the runner and the obliquely-radiating ribs will then carry it around to the aperture J, where it is discharged in an even stream through the discharge-chute down upon the stones of the mill. By means of the slide, which may be drawn out or in, opening or closing the passage of the chute by turning the screw, the amount of grain to be fed to the stones can be regulated.

By using this feeder, grain which has a tendency to stick together or lump may be distributed and fed into the mill in a loose and even current, and the runner of the feeder being revolved directly from the runner of the mill, the grain will be forced toward the chute with a corresponding force, and consequently in a corresponding quantity, to the speed of the runner, so that the millstones cannot be choked by a too-fast flow of grain during slackening of the speed of the mill-runner. Thus the meal or grist will be perfectly evenly ground, regardless of the speed of the runner, which will make this feeder useful in mills run by a variable power, such as horse-power, water-power, or wind, when the power depends upon a variable source which is not easily governed.

Having thus described my invention, I claim and desire to secure by Letters Patent of the United States—

In a feeder for grinding-mills, the combination of a cylindrical casing having an aperture in its bottom, a shield secured upon the inner side of said casing above said aperture, a chute, and a rotary disk within said casing having means, substantially as described, for conveying the grain to said aperture.

In testimony that I claim the foregoing as my own I have hereunto affixed my signature in presence of two witnesses.

MORRIS N. ELWELL.

Witnesses:
THOMAS McCULLY,
ORLANDO B. ASHCRAFT.